United States Patent
Kursun

(10) Patent No.: US 11,354,602 B2
(45) Date of Patent: Jun. 7, 2022

(54) SYSTEM AND METHODS TO MITIGATE POISONING ATTACKS WITHIN MACHINE LEARNING SYSTEMS

(71) Applicant: BANK OF AMERICA CORPORATION, Charlotte, NC (US)

(72) Inventor: Eren Kursun, New York, NY (US)

(73) Assignee: BANK OF AMERICA CORPORATION, Charlotte, NC (US)

(*) Notice: Subject to any disclaimer, the term of this patent is extended or adjusted under 35 U.S.C. 154(b) by 599 days.

(21) Appl. No.: 16/431,019

(22) Filed: Jun. 4, 2019

(65) Prior Publication Data

US 2020/0387833 A1 Dec. 10, 2020

(51) Int. Cl.
| | |
|---|---|
| H04L 29/06 | (2006.01) |
| G06F 21/55 | (2013.01) |
| G06N 20/20 | (2019.01) |
| H04L 9/40 | (2022.01) |
| G06F 21/56 | (2013.01) |
| H04L 61/4511 | (2022.01) |
| G06N 20/00 | (2019.01) |

(52) U.S. Cl.
CPC .......... *G06N 20/20* (2019.01); *G06F 21/562* (2013.01); *H04L 61/1511* (2013.01); *H04L 63/1416* (2013.01); *H04L 63/1425* (2013.01); *H04L 63/1433* (2013.01)

(58) Field of Classification Search
USPC .......................................................... 706/48
See application file for complete search history.

(56) References Cited

U.S. PATENT DOCUMENTS

| | | | |
|---|---|---|---|
| 7,603,709 | B2 | 10/2009 | Lewis et al. |
| 8,424,091 | B1 | 4/2013 | Su et al. |
| 8,910,280 | B2 | 12/2014 | Karasaridis |
| 8,997,220 | B2 | 3/2015 | Yu et al. |
| 9,430,646 | B1 | 8/2016 | Mushtaq et al. |
| 9,503,463 | B2 | 11/2016 | Karta et al. |
| 9,525,696 | B2 | 12/2016 | Kapoor et al. |
| 9,762,611 | B2 | 9/2017 | Wallace et al. |
| 9,781,150 | B1 | 10/2017 | Zhao et al. |
| 9,967,279 | B2 | 5/2018 | Chesla et al. |
| 11,017,321 | B1 | 5/2021 | Mishra et al. |
| 2004/0025044 | A1 | 2/2004 | Day |
| 2011/0225644 | A1 | 9/2011 | Pullikottil et al. |

(Continued)

*Primary Examiner* — Jude Jean Gilles
(74) *Attorney, Agent, or Firm* — Moore & Van Allen PLLC; Nicholas C. Russell

(57) ABSTRACT

Embodiments of the present invention provide a system and methods to mitigate poisoning attacks within machine learning systems. The invention includes an improved data analysis approach to train an ensemble of machine learning models to analyze received data and label the data in a non-binary fashion to indicate likelihood that certain data has been injected abnormally and should not be used for training purposes. The resulting dataset from the ensemble is assessed to determine convergence of model labeling and to detect outlier data labeling among models in the ensemble. Confidence scores for clustered interaction data may be performed on varied sets of training data populations and using a number of models. Output from the various training/model mixes are fed to a machine learning model to compare ensemble accuracy between different model sets and select the most accurate ensemble combination.

20 Claims, 7 Drawing Sheets

(56) References Cited

U.S. PATENT DOCUMENTS

| | | |
|---|---|---|
| 2012/0255027 A1 | 10/2012 | Kanakapura et al. |
| 2015/0082427 A1 | 3/2015 | Ivanchykhin et al. |
| 2017/0372201 A1 | 12/2017 | Gupta et al. |
| 2018/0124080 A1 | 5/2018 | Christodorescu et al. |
| 2018/0349605 A1 | 12/2018 | Wiebe et al. |
| 2018/0375885 A1* | 12/2018 | Chen .................. H04L 63/145 |
| 2019/0188562 A1 | 6/2019 | Edwards et al. |
| 2019/0190926 A1 | 6/2019 | Choi et al. |
| 2019/0222597 A1 | 7/2019 | Crabtree et al. |
| 2020/0107781 A1 | 4/2020 | Navalgund et al. |
| 2020/0273570 A1* | 8/2020 | Subramanian ........... G06N 3/08 |

\* cited by examiner

SYSTEM AND METHODS TO MITIGATE POISONING ATTACKS WITHIN MACHINE LEARNING SYSTEMS

BACKGROUND

Use of machine learning and artificial intelligence techniques to analyze interactions between users and entities is becoming more prevalent. In some cases, datasets used to train machine learning models may suffer from injection of abnormal data, as systems may rely on a single powerful machine learning model for decisioning purposes. As such, there is a need for improved systems that incorporate collaborative machine learning technology designed to detect and deter the injection of abnormal data and having an enhanced ability to preserve integrity of machine learning training and data analysis.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address these and/or other needs by providing an innovative system, method and computer program product for detection of and protection against injection of abnormal data into machine learning models, also referred to as "poisoning" attacks. A collaborative artificial intelligence system for improving machine learning model adaptability is provided. The system generally comprises deploying a population of machine learning models configured to adaptively monitor interaction data, wherein the interaction data comprises interactions between one or more users and one or more entities; receiving interaction data for interactions between the one or more users and the one or more entities and store the interaction data in a historical database; analyzing, using the population of machine learning models, the interaction data to generate confidence scores for each of the interactions, wherein the confidence scores represent a likelihood that each of the interactions may be abnormally injected data; determining, based on the confidence scores, that the likelihood of abnormality for one or more of the interactions is at or above a predefined threshold; and removing the one or more interactions from a training data set, wherein the training data set is used to train the population of machine learning models.

In some embodiments, analyzing the interaction data to generate the confidence scores further comprises analyzing an array of metadata associated with the interaction data.

In some embodiments, the likelihood for abnormality is determined by performing a cluster analysis of the analyzed interaction data.

In some embodiments, the system is further configured to respond to the abnormally injected data by altering underlying interaction data for the abnormally injected data or altering the machine learning model population.

In some embodiments, the system is further configured to: determine that one or more machine learning models from the machine learning model population has been trained using abnormally injected data; and remove the one or more machine learning models from the machine learning model population.

In some embodiments, the population of machine learning models is retrained after removing the one or more interactions are removed from the training data set.

In some embodiments, the system is further configured to: generate multiple unique machine learning model ensembles by adding or removing one or more machine learning models from the population of machine learning models; and continuously analyze and compare the confidence scores of each of the multiple unique machine learning model ensembles to determine outlier characteristics.

BRIEF DESCRIPTION OF THE DRAWINGS

Figure 1:
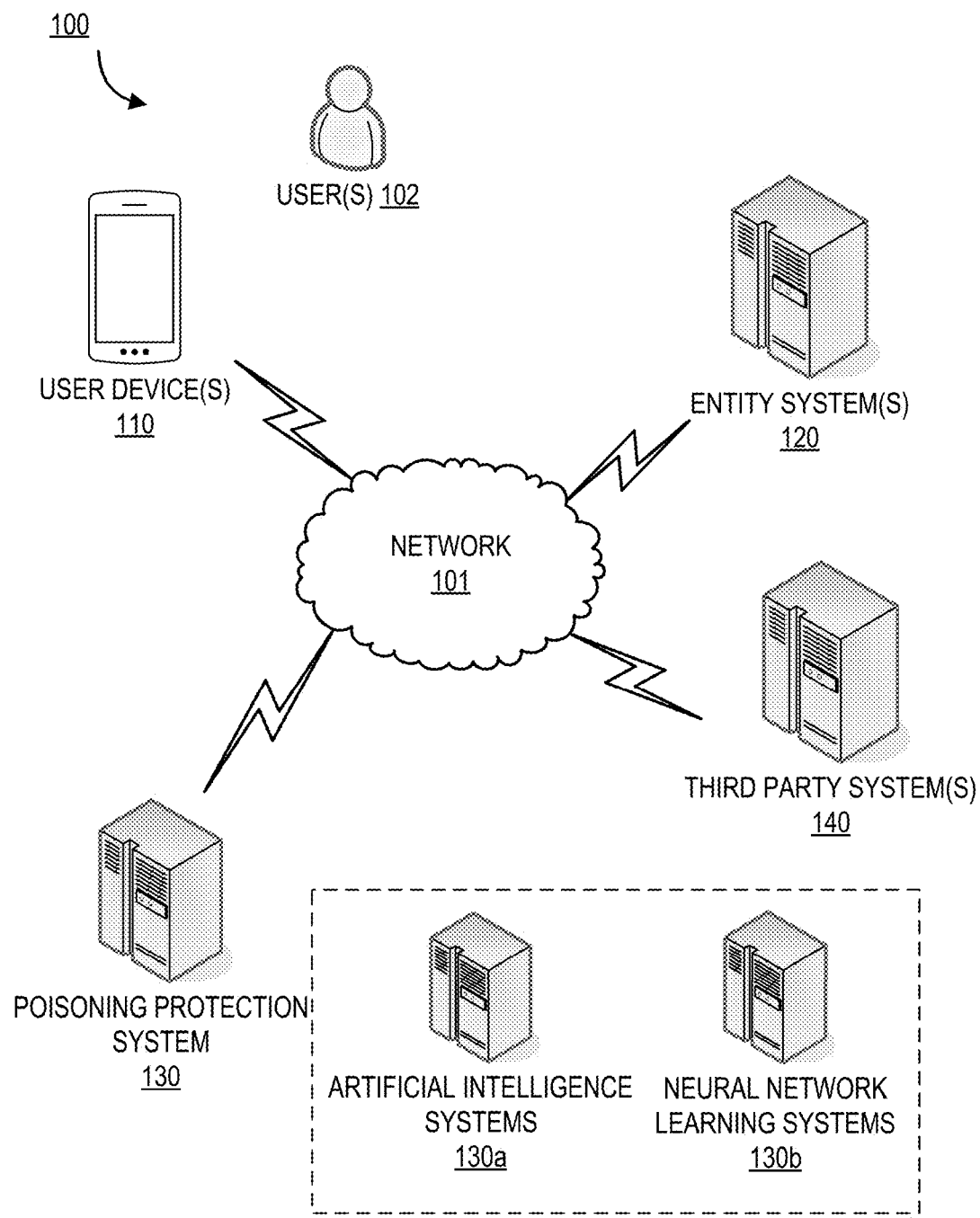
Figure 2:
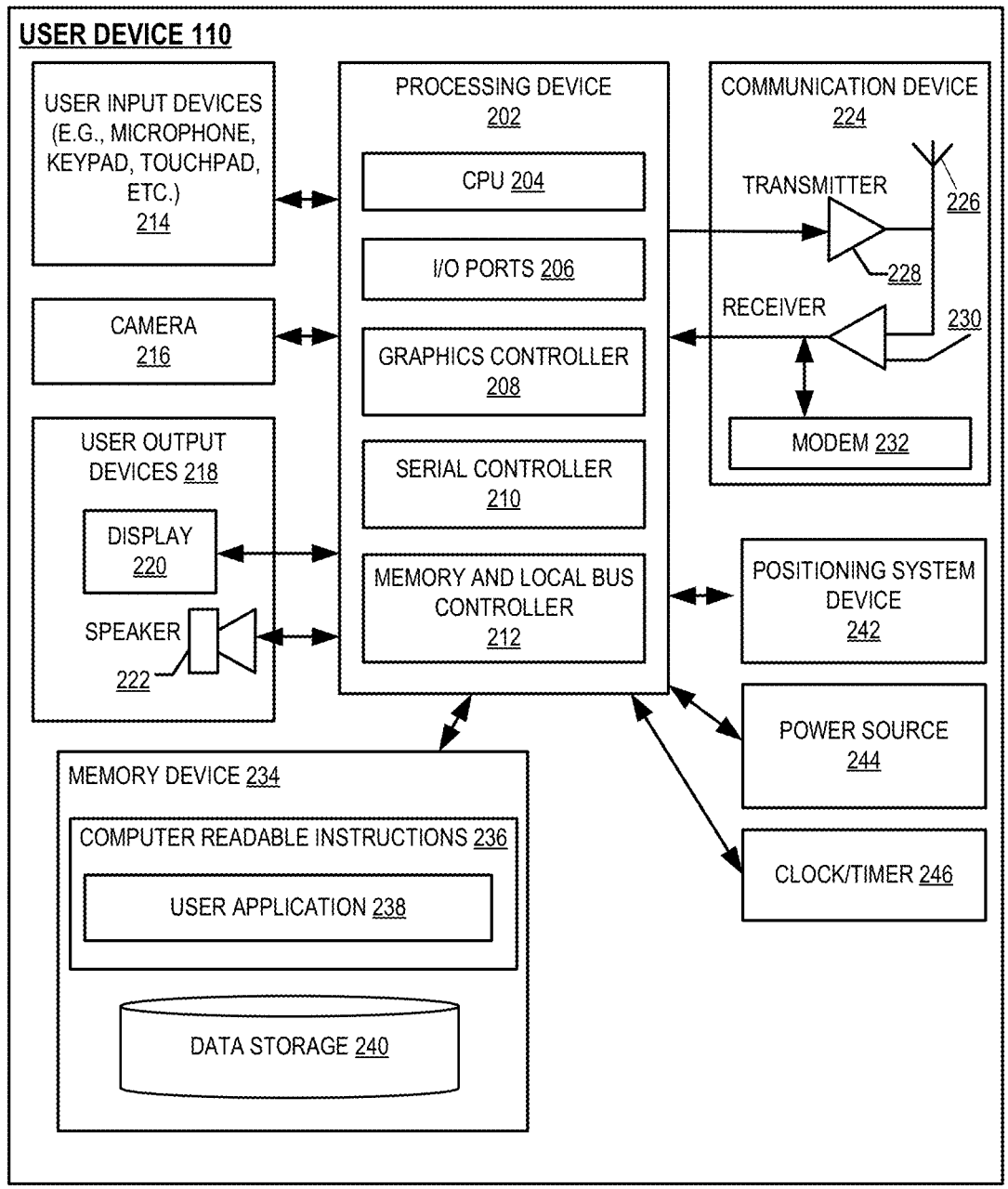
Figure 3:
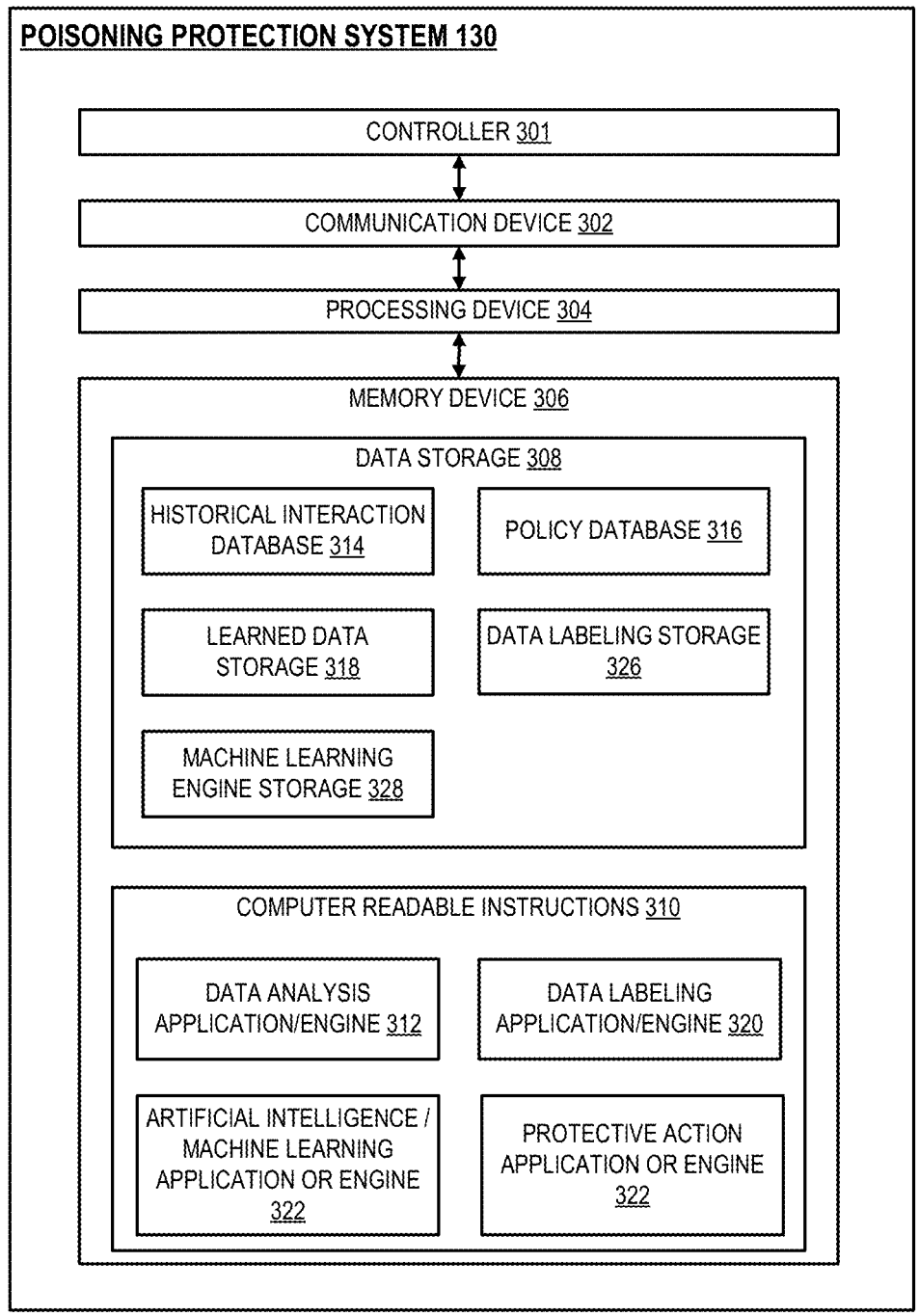
Figure 4:
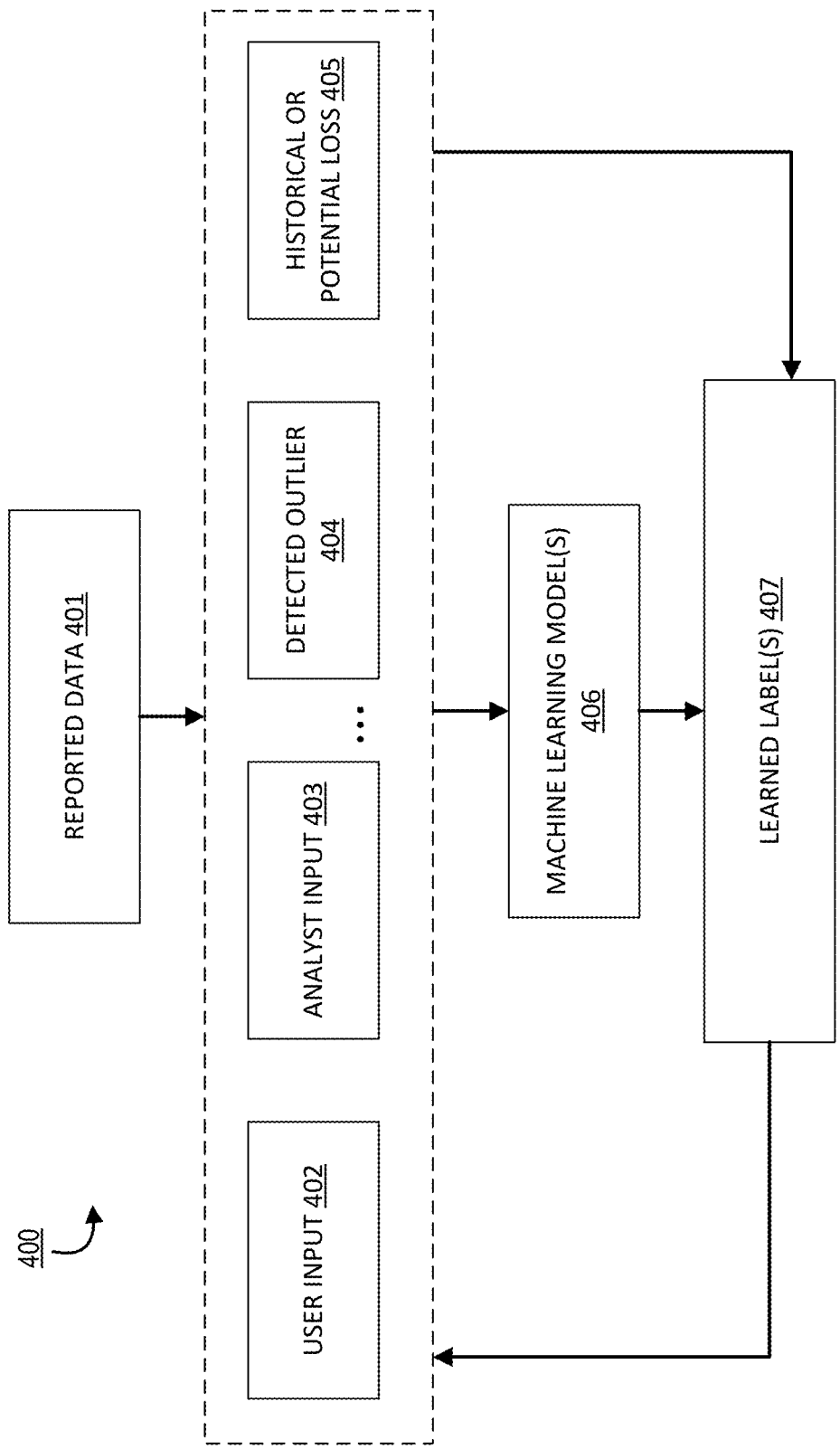
Figure 5:
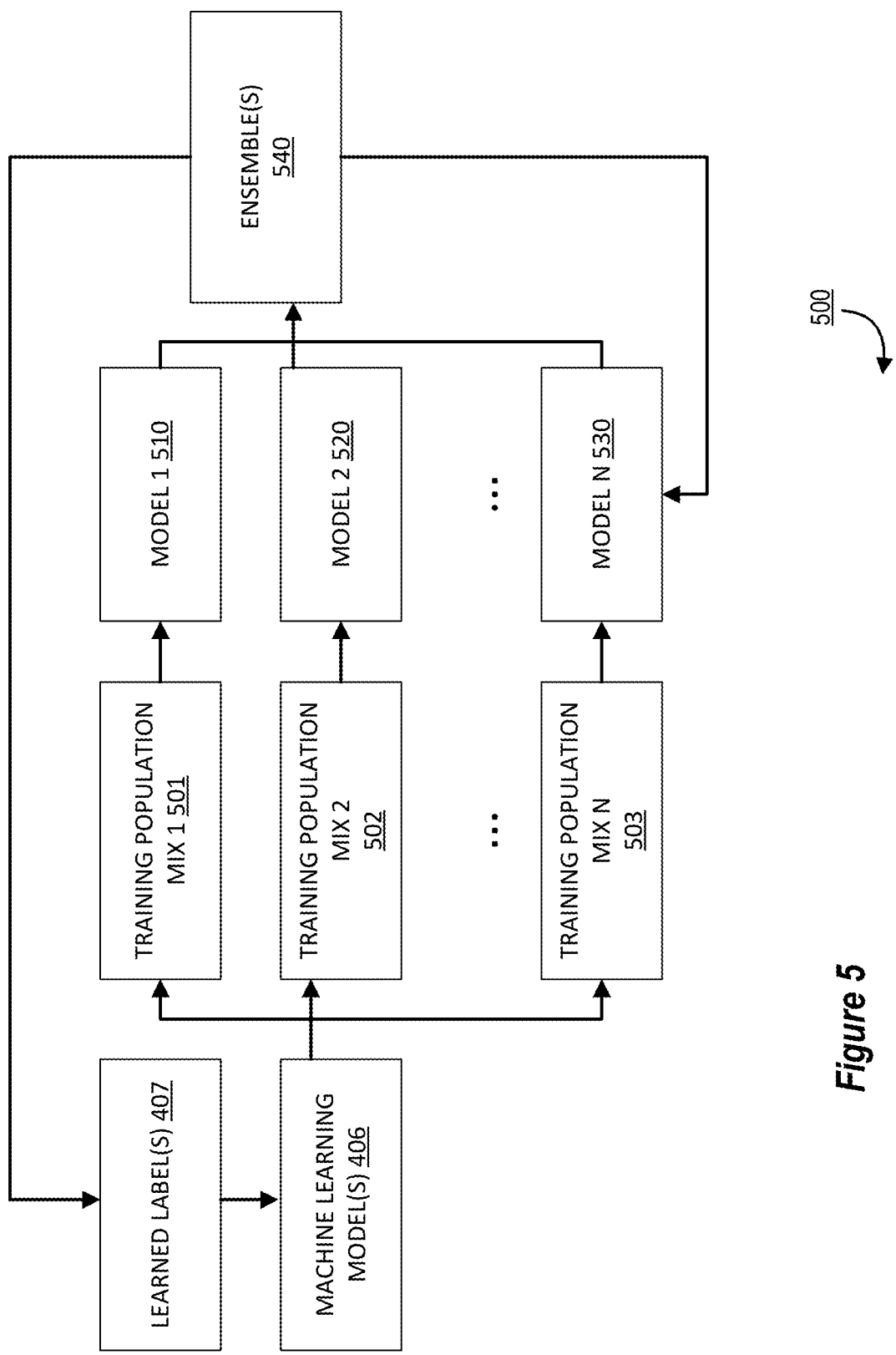
Figure 6:
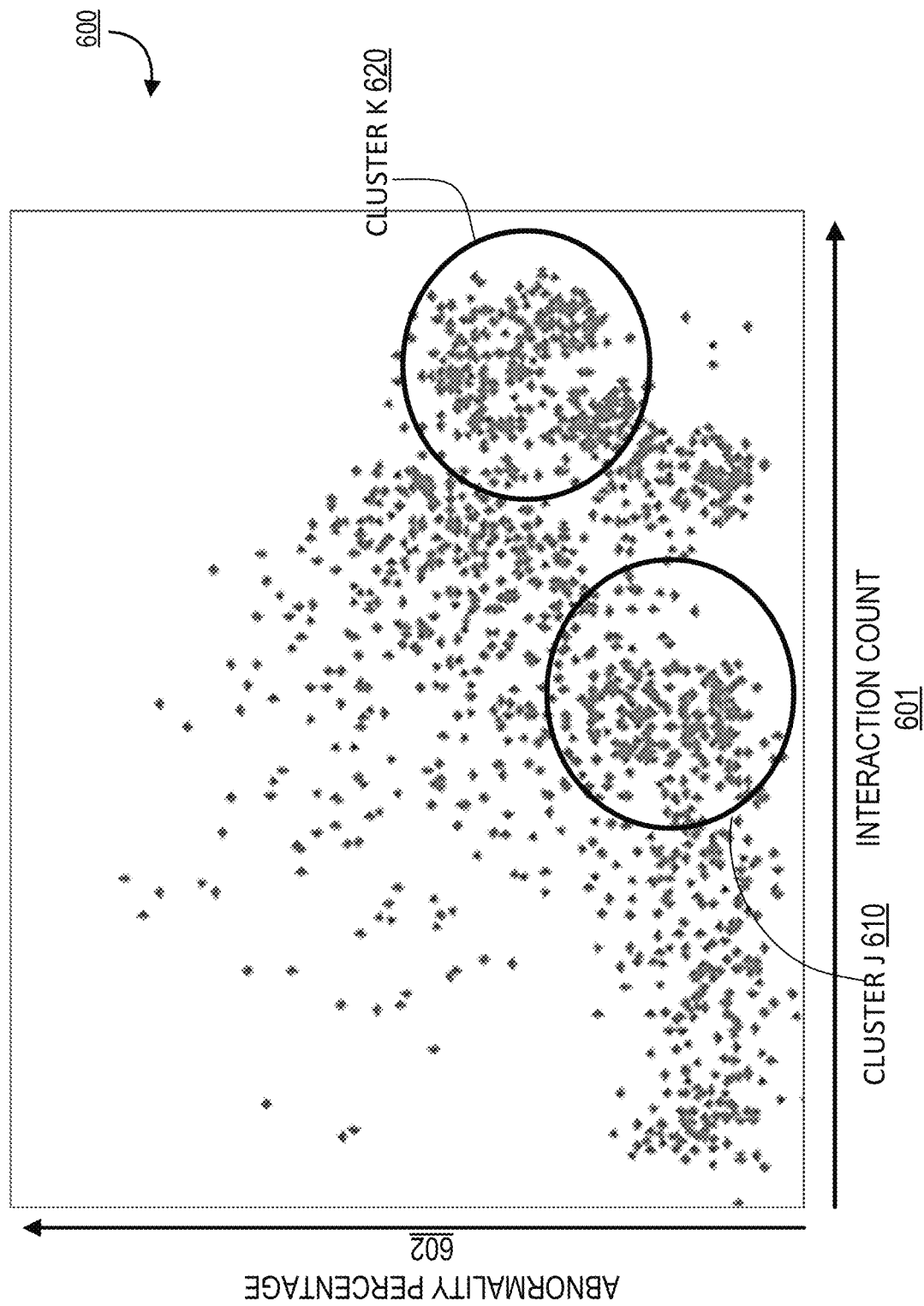
Figure 7:
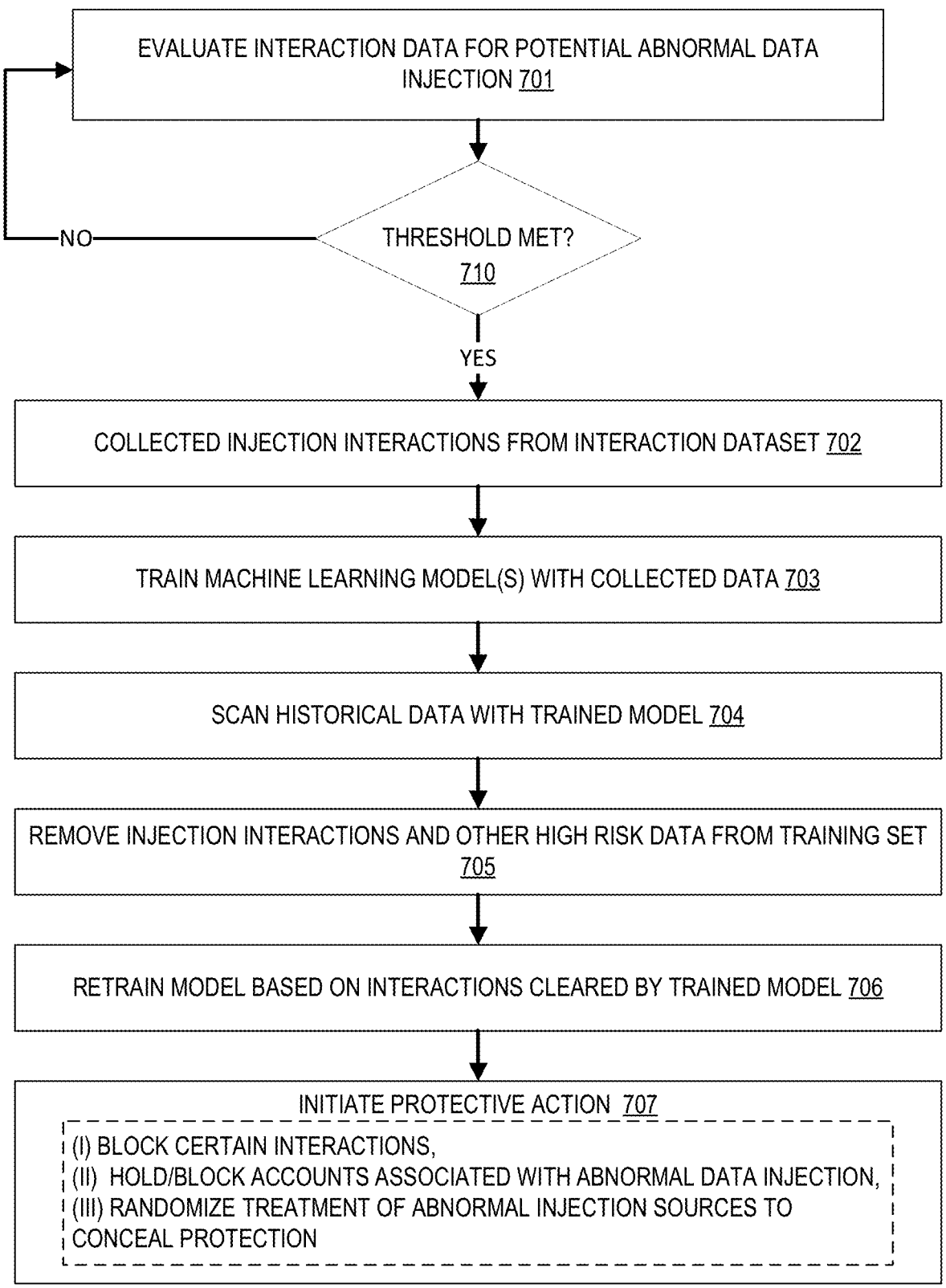

Having thus described embodiments of the invention in general terms, reference will now be made to the accompanying drawings, wherein:

FIG. 1 provides a poisoning protection system environment 100, in accordance with one embodiment of the invention;

FIG. 2 provides a block diagram of a user device, in accordance with one embodiment of the invention;

FIG. 3 provides a block diagram of a poisoning protection system, in accordance with one embodiment of the invention;

FIG. 4 provides a block diagram for reported data input and labeling, in accordance with one embodiment of the invention;

FIG. 5 provides a block diagram for machine learning model training and ensemble generation, in accordance with one embodiment of the invention;

FIG. 6 provides a graphical depiction for statistical analysis of model output, in accordance with one embodiment of the invention; and FIG. 7 provides a process flow for interaction evaluation and initiation of protective action, in accordance with one embodiment of the invention.

DETAILED DESCRIPTION OF EMBODIMENTS OF THE INVENTION

Embodiments of the system, as described herein leverage artificial intelligence, machine-learning, and/or other complex, specific-use computer systems to provide a novel approach for identifying and deterring the injection of abnormal data into systems designed to detect malfeasance, irregular or potentially harmful activity. The system utilizes a collection of machine learning models, either individually or clustered, to process interaction data to determine if specific data should be flagged as irregular or potentially harmful. The system may intelligently inject various historical data and synthetic data to further assess the patterns, metrics, and weighting structures associated with machine learning models. The system then analyzes and evaluates the models based on performance metrics of the models which gauge the performance (i.e., accuracy, resource efficiency, reliability, stability, and the like), adaptability (i.e., robustness and diversity, and the like), of the machine learning models. Based on identified patterns, the system is also configured to generate an ensemble of machine learning models in order to provide a combined group of models that is determined to be accurate and efficient in identifying relevant patterns for determining irregular activity or suspected malfeasance. In this way, the system may identify and counteract the effects of schemes employed by users who attempt to inject irregular data, or "poison" any single machine learning model provided by the system. Reconfiguration of the population of machine learning models may further include architectural changes through the addition and/or removal of particular models or model clusters as well as reweighting of models. As such, the present invention provides a technical solution to a technical problem of irregular data injection by implementing artificial intelligence and machine learning technologies in real time in order to shield from and counteract against poisoning of machine learning models designed to detect irregular activity.

In conventional systems, suspected malfeasance or irregular activity may be detected during a transaction or interaction with an entity and may either be detected by the entity as abnormal or be reported to the entity so that it may later be labeled as deceptive or abnormal input data. For instance, an interaction with an entity that involves resource transfer from an account stored at the entity may be flagged for a number of reasons, such as an irregular time of day, an associated geolocation that seems abnormal, a resource destination that is known to be associated with malfeasance, and the like. In this way, the entity may compare any given interaction with a baseline of known information in order to determine suspected malfeasance or abnormality. Alternatively, the entity may receive a communication from a user that a given interaction is not legitimate and should be flagged as abnormal or irregular, and the entity system may flag similar interactions as suspect. These conventional approaches leave room for users inject illegitimate data to the entity system such that the entity forms an inaccurate assessment of what it considers as normal, baseline activity. For instance, the user may periodically initiate a transfer or resources at certain locations, times of day, and the like in order to prime the entity system to authorize a later transfer of resources that may not be legitimate. This is also known as a "poisoning attack."

In addition, conventional systems may use a binary approach to labeling interactions or resource transfers as abnormal or malfeasant. This "legitimate" versus "illegitimate" approach to analyzing interactions makes it difficult for the entity to accurately predict patterns of suspect behavior due to the limited amount of data collected. The present invention improves on these conventional approaches by providing a system for using an ensemble of machine learning models that are trained using varied data populations in order to analyze patterns of interactions and user behavior and to determine a confidence score, or predicted percentage value, that a given interaction may be abnormal or malfeasant. The system considers reported input data from users and analysts, but assigns a weighted value and combines this input with other observed interaction data from various other channels, thus using a wider variety of metrics in order to make a determination about suspected abnormal activity versus conventional systems. Additionally, each machine learning model may be later assessed to determine prediction accuracy, which allows the system to be optimized for accuracy by varying the machine learning model ensemble combination used in certain embodiments. The ensemble of machine learning models trained using varied data populations also makes the system less susceptible to poisoning attacks by lowering the overall probability that illegitimate data has been injected into the ensemble as a whole.

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on."

As used herein, the term "user" may refer to any entity or individual associated with the collaborative machine learning system. In some embodiments, a user may be a computing device user, a phone user, a mobile device application user, a customer of an entity or business, a system operator, and/or employee of an entity (e.g., a financial institution). In a specific embodiment, a user may be a managing user of a population of machine learning models, wherein the system enables the user to reconfigure the population based on user-specified criteria and policies. In another specific embodiment, a user may be a customer accessing a user account via an associated user device, wherein data from an interaction between the user and an entity is analyzed or processed by the system. In some embodiments, identities of an individual may include online handles, usernames, identification numbers (e.g., Internet protocol (IP) addresses), aliases, family names, maiden names, nicknames, or the like. In some embodiments, the user may be an individual or an organization (i.e., a charity, business, company, governing body, or the like).

As used herein the term "user device" may refer to any device that employs a processor and memory and can perform computing functions, such as a personal computer or a mobile device, wherein a mobile device is any mobile communication device, such as a cellular telecommunications device (i.e., a cell phone or mobile phone), a mobile Internet accessing device, or other mobile device. Other types of mobile devices may include laptop computers, tablet computers, wearable devices, cameras, video recorders, audio/video player, radio, global positioning system (GPS) devices, portable digital assistants (PDAs), pagers, mobile televisions, entertainment devices, or any combination of the aforementioned. The device may be used by the user to access the system directly or through an application, online portal, internet browser, virtual private network, or other connection channel.

As used herein, the term "entity" may be used to include any organization or collection of users that may interact with the collaborative machine learning system. An entity may refer to a business, company, or other organization that either maintains or operates the system or requests use and accesses the system. In one embodiment, the entity may be a software development entity or data management entity. In a specific embodiment, the entity may be a cybersecurity entity or misappropriation prevention entity. The terms "financial institution" and "financial entity" may be used to include any organization that processes financial transactions including, but not limited to, banks, credit unions, savings and loan associations, investment companies, stock brokerages, management firms, insurance companies and the like. In other embodiments, an entity may be a business, organization, a government organization or the like that is not a financial institution.

As used herein, "authentication information" may refer to any information that can be used to identify a user. For example, a system may prompt a user to enter authentication information such as a username, a password, a personal identification number (PIN), a passcode, biometric information (e.g., voice authentication, a fingerprint, and/or a retina scan), an answer to a security question, a unique intrinsic user activity, such as making a predefined motion with a user device. This authentication information may be used to at least partially authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system.

To "monitor" is to watch, observe, or check something for a special purpose over a period of time. The "monitoring" may occur periodically over the period of time, or the monitoring may occur continuously over the period of time. In some embodiments, a system may actively monitor a data source, data stream, database, or data archive, wherein the system reaches out to the database and watches, observes, or checks the database for changes, updates, and the like. In other embodiments, a system may passively monitor a database or data stream, wherein the database or data stream provides information to the system and the system then watches, observes, or checks the provided information. In some embodiments, "monitoring" may further comprise analyzing or performing a process on something such as a data source or data stream either passively or in response to an action or change in the data source or data stream. In a specific embodiment, monitoring may comprise analyzing performance of one or more machine learning models or engines using performance metrics associated with one or more of the models.

As used herein, an "interaction" may refer to any action or communication between users, entities, or institutions, and/or one or more devices or systems within the system environment described herein. For example, an interaction may refer to a user interaction with a system or device, wherein the user interacts with the system or device in a particular way. In one embodiment, interactions may be received or extracted from a data stream (e.g., in real-time). An interaction may include user interactions with a user interface (e.g., clicking, swiping, text or data entry, and the like), authentication actions (e.g., signing-in, username and password entry, PIN entry, and the like), account actions (e.g., account access, fund transfers, and the like) and the like. In another example, an interaction may refer to a user communication via one or more channels (i.e., phone, email, text, instant messaging, brick-and-mortar interaction, and the like) with an entity and/or entity system to complete an operation or perform an action with an account associated with user and/or the entity.

FIG. 1 provides a poisoning protection system environment 100, in accordance with one embodiment of the invention. As illustrated in FIG. 1, the poisoning protection system 130 is operatively coupled, via a network 101, to the user device(s) 110 and the entity system 120. In this way, the poisoning protection system 130 can send information to and receive information from the user device 110 and the entity system 120. In the illustrated embodiment, the additional of a plurality of user devices 110 may provide a plurality of communication channels through which the entity system 120 and/or the poisoning protection system 130 may communicate with the user 102 over the network 101.

In the illustrated embodiment, the poisoning protection system 130 further comprises an artificial intelligence (AI) system 130a and a machine learning system 130b which may be separate systems operating together with the poisoning protection system 130 or integrated within the poisoning protection system 130.

FIG. 1 illustrates only one example of an embodiment of the poisoning protection system environment 100. It will be appreciated that in other embodiments, one or more of the systems, devices, or servers may be combined into a single system, device, or server, or be made up of multiple systems, devices, or servers. It should be understood that the servers, systems, and devices described herein illustrate one embodiment of the invention. It is further understood that one or more of the servers, systems, and devices can be combined in other embodiments and still function in the same or similar way as the embodiments described herein.

The network 101 may be a system specific distributive network receiving and distributing specific network feeds and identifying specific network associated triggers. The network 101 may also be a global area network (GAN), such as the Internet, a wide area network (WAN), a local area network (LAN), or any other type of network or combination of networks. The network 101 may provide for wireline, wireless, or a combination wireline and wireless communication between devices on the network 101.

In some embodiments, the user 102 is an individual interacting with the entity system 120 via a user device 110 while a data flow or data stream between the user device 110 and the entity system 120 is monitored by or received by the poisoning protection system 130 over the network 101 to be processed or analyzed. In some embodiments a user 102 is a user requesting service from the entity (e.g., customer service) or interacting with an account maintained by the entity system 120. In an alternative embodiment, the user 102 is a user interacting with, maintaining, or employing a population of machine learning models, wherein the system enables the user to reconfigure the population based on user-specified criteria and policies FIG. 2 provides a block diagram of a user device 110, in accordance with one embodiment of the invention. The user device 110 may generally include a processing device or processor 202 communicably coupled to devices such as, a memory device 234, user output devices 218 (for example, a user display device 220, or a speaker 222), user input devices 214 (such as a microphone, keypad, touchpad, touch screen, and the like), a communication device or network interface device 224, a power source 244, a clock or other timer 246, a visual capture device such as a camera 216, a positioning system device 242, such as a geo-positioning system device like a GPS device, an accelerometer, and the like. The processing device 202 may further include a central processing unit 204, input/output (I/O) port controllers 206, a graphics controller or graphics processing device (GPU) 208, a serial bus controller 210 and a memory and local bus controller 212.

The processing device 202 may include functionality to operate one or more software programs or applications, which may be stored in the memory device 234. For example, the processing device 202 may be capable of operating applications such as the user application 238. The user application 238 may then allow the user device 110 to transmit and receive data and instructions from the other devices and systems of the poisoning protection system environment 100. The user device 110 comprises computer-readable instructions 236 and data storage 240 stored in the memory device 234, which in one embodiment includes the computer-readable instructions 236 of a user application 238. In some embodiments, the user application 238 allows a user 102 to access and/or interact with other systems such as the entity system 120. In one embodiment, the user is a maintaining entity of a collaborative machine learning control system, wherein the user application enables the user to define policies and reconfigure a population of machine learning models. In one embodiment, the user is a customer of a financial entity and the user application 238 is an online banking application providing access to the entity system 120 wherein the user may interact with a user account via a user interface of the user application 238, wherein the user interactions may be provided in a data stream as an input to one or more machine learning models.

The processing device 202 may be configured to use the communication device 224 to communicate with one or more other devices on a network 101 such as, but not limited to the entity system 120 and the poisoning protection system 130. In this regard, the communication device 224 may include an antenna 226 operatively coupled to a transmitter 228 and a receiver 230 (together a "transceiver"), modem 232. The processing device 202 may be configured to provide signals to and receive signals from the transmitter 228 and receiver 230, respectively. The signals may include signaling information in accordance with the air interface standard of the applicable BLE standard, cellular system of the wireless telephone network and the like, that may be part of the network 201. In this regard, the user device 110 may be configured to operate with one or more air interface standards, communication protocols, modulation types, and access types. By way of illustration, the user device 110 may be configured to operate in accordance with any of a number of first, second, third, and/or fourth-generation communication protocols and/or the like. For example, the user device 110 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, and/or the like. The user device 110 may also be configured to operate in accordance with non-cellular communication mechanisms, such as via a wireless local area network (WLAN) or other communication/data networks. The user device 110 may also be configured to operate in accordance Bluetooth® low energy, audio frequency, ultrasound frequency, or other communication/data networks.

The user device 110 may also include a memory buffer, cache memory or temporary memory device operatively coupled to the processing device 202. Typically, one or more applications 238, are loaded into the temporarily memory during use. As used herein, memory may include any computer readable medium configured to store data, code, or other information. The memory device 234 may include volatile memory, such as volatile Random Access Memory (RAM) including a cache area for the temporary storage of data. The memory device 234 may also include non-volatile memory, which can be embedded and/or may be removable. The non-volatile memory may additionally or alternatively include an electrically erasable programmable read-only memory (EEPROM), flash memory or the like.

Though not shown in detail, the system further includes one or more entity systems 120 (as illustrated in FIG. 1) which is connected to the user device 110 and the poisoning protection system 130 and which may be associated with one or more entities, institutions or the like. In this way, while only one entity system 120 is illustrated in FIG. 1, it is understood that multiple networked systems may make up the poisoning protection system environment 100. The entity system 120 generally comprises a communication device, a processing device, and a memory device. The entity system 120 comprises computer-readable instructions stored in the memory device, which in one embodiment includes the computer-readable instructions of an entity application. The entity system 120 may communicate with the user device 110 and the poisoning protection system 130 to provide access to one or more user accounts stored and maintained on the entity system 120. In some embodiments, the entity system 120 may communicate with the poisoning protection system 130 during an interaction with a user 102 in real-time, wherein user interactions may be monitored and processed by the poisoning protection system 130 in order to analyze interactions with the user 102 and reconfigure a population of machine learning models in response to changes in a received or monitored data stream.

FIG. 3 provides a block diagram of a poisoning protection system 130, in accordance with one embodiment of the invention. The poisoning protection system 130 generally comprises a controller 301, a communication device 302, a processing device 304, and a memory device 306.

As used herein, the term "controller" generally refers to a hardware device and/or software program that controls and manages the various systems described herein such as the user device 110, the entity system 120, and/or the poisoning protection system 130, in order to interface and manage data flow between systems while executing commands to control the systems. In some embodiments, the controller may be integrated into one or more of the systems described herein. In some embodiments, the controller may perform one or more of the processes, actions, or commands described herein.

As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 304 is operatively coupled to the communication device 302 and the memory device 306. The processing device 304 uses the communication device 302 to communicate with the network 101 and other devices on the network 101, such as, but not limited to the user device 110 and the entity system 120. As such, the communication device 302 generally comprises a modem, server, or other device for communicating with other devices on the network 101.

As further illustrated in FIG. 3, the poisoning protection system 130 comprises computer-readable instructions 310 stored in the memory device 306, which in one embodiment includes the computer-readable instructions 310 of a data analysis application or engine 312, a synthetic data application or engine 320, and an artificial intelligence application 322 which further comprises a machine learning engine. In one embodiment, the artificial intelligence application 322 and machine learning engine may be utilized by the data analysis application 312 and/or synthetic data application 320 to, respectively, analyze performance metrics of a population of machine learning models and generate synthetic data for injection into the population based on the analysis.

In some embodiments, the memory device 306 includes data storage 308 for storing data related to the system environment, but not limited to data created and/or used by the data analysis application 312, synthetic data application 320, an artificial intelligence application 322, and a machine learning engine such as the historical interaction database 314, policy database 316, learned data storage 318, data labeling storage 326, and the machine learning engine storage 328.

The historical interaction database 314 is used to store information regarding past interactions (e.g., account actions, transactions, communications, inputs) and/or content of a past data stream. In some embodiments, the historical interaction database 314 may be configured to store data from an incoming data stream in real-time. In some embodiments, the policy database 316 is configured to store pre-determined policies, conditions, rules, thresholds, or the like for evaluating and managing the poisoning protection system 130 (e.g., model configurations and adaptations). The policy database 316 my further be configured to store learned policies, conditions, rules, thresholds, or the like as determined in real-time by the machine learning models of the system described herein. In some embodiments, the policy database 316 is further configured to store risk metrics, system performance metrics, cost metrics, benefit metrics, cost-change metrics, adversarial scenarios or data, extrapolated scenarios or data, and the like associated with the poisoning protection system 130. In some embodiments, the policy database 316 and/or the historical interaction database 314 include pre-existing training data for training a machine learning or artificial intelligence engine. In some embodiments, the policy database 316 is configured for storing settings associated with the system itself such as energy efficiency settings, computer resource use efficiency settings, response time settings, regulatory guidelines, and the like.

The data labeling storage 326 is configured to store labels received and generated by the system (i.e., via synthetic data labeling application/engine 320). The data labels stored in the data labeling storage 326 may be used for training a machine learning model or artificial intelligence engine. The data labeling storage 326 may include adversarial or extrapolated scenarios or data generated by the systems described herein which may be fed back into machine learning models to train the system. In some embodiments, the system 130 may include an adversarial function configured for providing adversarial learning and modeling to the system by introducing unreliable or erroneous data to the system; a learning or adaptation function for defining system response to data changes or an adaptation rate for implementing changes (i.e., model reconfiguration) within an architecture of the systems described herein; and an alertness function and robustness function for defining an appropriate system reaction, response, or extent of system reaction based on one or more environmental conditions or previous interactions.

The machine learning engine storage 328 is configured for storing one or more artificial intelligence engines, machine learning models, or the like. The AI engines and machine learning models described herein may include engines and/or models directed to, for example, cybersecurity, marketing, misappropriation detection, medicine, autonomous deices (e.g., self-driving cars), AI assistants, or the like. In one embodiment, the machine learning engine storage 328 is configured to store a collection of diverse machine learning engines/models to provide the system with a high level of adaptability to constantly changing environments (i.e., changes in a received data stream).

In one embodiment of the invention, the poisoning protection system 130 may associate with applications having computer-executable program code that instructs the processing device 304 to perform certain functions described herein. In one embodiment, the computer-executable program code of an application associated with the user device 110 and/or the entity system 120 may also instruct the processing device 304 to perform certain logic, data processing, and data storing functions of the application. In one embodiment, the poisoning protection system 130 further comprises a dynamic optimization algorithm to be executed by the processing device 304 or a controller 301 for reconfiguring a machine learning model based on, for example, analyzed performance metrics. That said, the algorithm may further include a data pattern of a streamed data source a data output from one or more models, or the like during an assessment of a new model population reconfiguration. The dynamic optimization algorithm may further receive the data stream and identified changes to the data stream in real-time for determining reconfigurations.

Embodiments of the poisoning protection system 130 may include multiple systems, servers, computers or the like maintained by one or many entities. In some embodiments, the poisoning protection system 130 may be part of the entity system 120. In other embodiments, the entity system 120 is distinct from the poisoning protection system 130. The poisoning protection system 130 may communicate with the entity system 120 via a secure connection generated for secure encrypted communications between the two systems either over the network 101 or alternative to the network 101.

The present system, such as the poisoning protection system 130, utilizes a collection of machine learning models, either individually or clustered, for processing input from a real-time data stream. The system analyzes and evaluates the models based on performance metrics of the models which gauge the performance (i.e., accuracy, resource efficiency, reliability, stability), adaptability (i.e., robustness and diversity), and the like of the machine learning models. By providing access to a large pool of diverse AI engines and machine learning models, the system may adapt to changing environmental conditions in a real-time data stream by reconfiguring the population of the models. Furthermore, the machine learning models may be retrained based on the analysis of the entire population to further adapt. Reconfiguration of the population may further include architectural changes through the addition and/or removal of particular models or model clusters as well as reweighting of models.

FIG. 4 provides a block diagram 400 for reported data input and labeling, in accordance with one embodiment of the invention. As shown, reported data 401 may be received as input to the machine learning model 406 in a number of ways, as represented in FIG. 4 as user input 402, analyst input 403, detected outlier 404 and historical or potential loss 405. The reported data 401 may be received from users 102, entity systems 120, or third party systems 140. Suspected malfeasance or irregular/abnormal activity may be detected during a transaction or interaction with the entity, and may be reported to the entity so that it may later be labeled as deceptive or abnormal input data, or support the creation of a learned label 407. In some embodiments, such input data may represented as user input 402 or analyst input 403. In this way, users, who may be customers, employees, analysts, account-holders or the like, may manually self-report certain interaction or transaction data as irregular. For instance, in some embodiments, an interaction with the entity or a user account managed by the entity that involves resource transfer may be flagged for a number of reasons, such as the resource transfer being initiated at certain time of day, an associated geolocation that is normally not associated with the account, an abnormally large resource request amount, or a requested resource destination that is known, based on historical data, to be associated with malfeasance, and the like. As shown, user input 402 and analyst input 403 are subsets of reported data that the system may receive and process via machine learning model 406.

Also shown in FIG. 4 are detected outlier 404 and historical or potential loss 405. As the machine learning model 406 receives reported data 401, the machine learning model is trained to detect patterns in the reported data that appear abnormal or irregular. The machine learning model 406 may receive reported data 401 that it detects to be abnormal and flag the data as a detected outlier 404. In addition, based on information stored by the entity and accessible by the machine learning model 406, the system may calculate a historical or potential loss 405 based on associated resource accounts, distribution channels, historical data, and the like.

In instances where the historical or potential loss 405 associated with reported data 401 is high, the machine learning model 406 may assign a greater weight, and may create a learned label for such data that is associated with high risk for potential malfeasance. As such, the machine learning model 406 incorporates a number of reported data 401 inputs that are analyzed according to various data metrics, such as potential loss, account association, resource distribution channels, and the like in order to analyze the reported data and produce a weighted percentage, such as a percentage from zero percent to one hundred percent, that provides a granular portrait of potential malfeasance rather than a binary "regular" or "irregular" label. Because of this, the learned label 407 is not an absolute number, but is instead a gradient of scores using the above mentioned input data. Different population samples can be generated using the different input groupings and learned label 407 gradients. In addition, ss each of the input streams may change over time, for example, associated losses and outlier patterns that may change over time, the learned label(s) 407 may be altered as well increase model accuracy and to minimize potential losses from irregular or malfeasant activity.

FIG. 5 provides a block diagram 500 for machine learning model training and ensemble generation, in accordance with one embodiment of the invention. As shown, the system may train the machine learning model(s) 406 with various combinations of training population data. Training population data may be varied in any number of ways to produce mixes numbered 1 through "N," as depicted in FIG. 5 by training population mix 1 501, training population mix 2 502 and training population mix N 503. The machine learning model (s) 406 are trained based on the training population mixes to produce any number of various models numbered 1 through "N," as depicted in FIG. 5 as model 1 510, model 2 520, and model N 530. Models 1-N may then be combined, or ensembled, to produce ensemble(s) 540.

The training population mixes 1-N may be varied such that they contain a known percentage of data that is known to indicate irregular or malfeasant activity. For instance, in some embodiments, training population mix 1 501 may include 70% data that is known to likely indicate irregular or malfeasant activity, while training population mix 2 502 may include 100% data that is known to likely indicate irregular or malfeasant activity. It is understood that the training population mixes 1-N may include any number of variations of data and may be used to train any number of machine learning models 406 such that the models are uniquely configured to identify patterns and label reported data 401 accordingly. The data incorporated in training population mixes 1-N may include historical data from previously reported data 401, such as past interactions of resource transfers between users or user accounts managed by the entity systems 120, or may include synthetic data generated by the entity systems 120 that mimics observed or past reported data in some ways.

The data incorporated in training population mixes 1-N may also include a number of different characteristics for each observed interaction, including metadata associated with resource amount, time period for interactions, resource distribution channels used, geographic location (i.e. location of devices, accounts, users, and third party systems), device characteristics, interaction frequency, user account authentication credentials, frequency of account use, length of time of existence of user accounts, various biometric data, and the like. As such, the machine learning model(s) 406 may be trained to identify patterns associated with any or all of the metadata characteristics associated or incorporated in the data included in the training population mixes 1-N. In some embodiments, the models 1-N may be ensembled such that they make determinations and label reported data 401 in a committee fashion. For instance, if certain number of models 1-N makes a determination that a certain interaction or reported data point represents abnormal activity, the ensemble 540 may label the data point accordingly. The threshold that determines a committee consensus between the models 1-N regarding a given data label may be adjusted according to user preferences. For instance, in some embodiments, user may require that the majority of models 1-N included in the ensemble 540 agree on a label in order to deem the output as the learned label 407. In other embodiments, the user may configure the ensemble such that only a certain number or percentage of models must agree, or produce the same or similar label for a specific data point, in order for the output to be deemed the learned label 407.

In some embodiments, the learned label 407 may include a gradient score weighted according to the percentage of models in the ensemble that were able to form a consensus that the data represents an irregular interaction. In other embodiments, the learned label 407 may include a gradient score weighed according to the confidence score associated with a particular model or models that the system has deemed most reliable. These configurations may be adjusted at any time by the user according to further assessment of the effectiveness and accuracy of particular models or effectiveness and accuracy of the ensemble 540. The models 1-N and ensemble 540 are monitored by the system in order to assess accuracy and irregularities in predictive output.

FIG. 6 provides a graphical depiction 600 for statistical analysis of interaction count and abnormality percentage, in accordance with one embodiment of the invention. As shown, the data received and analyzed by the models may be graphed and analyzed using a scatterplot method comparing interaction count 601 and abnormality percentage 602. The resulting clusters of datapoints may be observed and used to make determinations about the projected accuracy or confidence associated with model output. In some embodiments, the graphical depiction 600 may represent the output of a single model over time, wherein the clusters may be used to determine a confidence score associated with a particular set of interactions. In other embodiments, the graphical depiction 600 may include output data from a number of models 1-N and the clusters may indicate that a consensus between models is being formed, as indicated by the density of the clusters. For instance, cluster J 610 may represent a densely populated area of the graphical depiction where the ensemble 540 of models 1-N are forming a consensus as to a low abnormality percentage. Cluster K 620, on the other hand, may indicate that the ensemble 540 of models 1-N is forming a consensus as to a relatively higher abnormality percentage at 602 at a higher interaction count 601.

Data clusters, such as cluster J 610 and cluster K 620 may be further analyzed to determine which specific models 1-N appear more frequently in the clusters. If one or more models are over-represented or under-represented in any given cluster, this may be an indicator that the model or models have suffered from the injection of abnormal data and are no longer labeling data accurately or effectively. In some embodiments, the data points in the clusters may be further analyzed to determine the specific metadata associated with a certain abnormality percentage 602 or interaction count 601. Certain data outliers, or data points that are relatively distant from the clusters, may indicate that a specific model or models are performing erratically or ineffectively. These determinations can be used by the system to determine which models may need to be added or removed from ensemble 540.

FIG. 7 provides a process flow for interaction evaluation and initiation of protective action, in accordance with one embodiment of the invention. As shown at block 701, the process begins by evaluating interaction data for potential abnormal data injection. As discussed previously, the evaluation of interaction data may monitor any number of data characteristics or metadata information in order to identify abnormal activity or some pattern of injection of abnormal data and which may represent malfeasant activity. By monitoring any number of datapoints associated with the interaction data itself (for example, time stamp, resource amount, communication channel, geographic location, biometric information, previously known malfeasant activity, frequency of occurrence, and the like), the system can generate a confidence score that the received interaction data may be abnormally injected data based on the extent to which the evaluation metrics fit the identified pattern or prediction algorithm generated by the ensemble of machine learning models. The confidence score may be represented as a gradient, for example a percentage (for example, from 1% to 100% with any number of decimal places) in order to accurately compare and score interaction data in a granular fashion.

If the determined metric threshold for determination of abnormal data injection is met, the process proceeds, to block 702, or alternatively the evaluation process continues if the threshold is not met as shown at decision diamond 710.

The metric for determining abnormal data injection may be set as determined by statistical analysis, such as described in FIG. 6, while in other embodiments the metric may be determined by a user defined setting, a known indicator associated with abnormality, a specific metadata indicator associated with abnormality, or historical data stored by the system. In some embodiments, the metric may be determined according to recognized patterns of interactions as identified by the machine learning model(s) 406. Interactions determined to be abnormal data injections are collected as shown in block 702, and then used to train the machine learning model(s) 406 as shown in block 703. In this way, the machine learning model(s) 406 may be trained to identify interactions that exhibit the same or similar characteristics as those that are known to indicate abnormal activity or abnormal data injection.

Next, the trained models are used to scan historical data, as shown in block 704. The can of historical data by the trained models may be evaluated in order to assess whether or not the trained models are accurately identifying abnormal interaction and abnormal data characteristics. Following the scan of historical data by the trained models, injection interactions may be identified and removed from the data training set, along with other data that may be labeled as high risk or outlier data, as shown by block 705. At this point, the model may be retrained based on interactions cleared by the trained models, as shown at block 706. In this way, the system ensures that abnormal data injection is not harming the training process of the machine learning model(s) 406 by being accounted for as legitimate interaction data.

Finally, the system may initiate a protective action, as shown in block 707. In various embodiments, the initiation of a protective action may take a number of different forms, some of which are included in block 707 as exemplary embodiments. While protective actions are not limited to these examples, one or more of the examples may be employed by the system to deter the injection of abnormal data into the training data set used for the machine learning model(s) 406. For instance, the system may block certain interactions that contain the same or similar characteristics as previously identified abnormal injected data, as determined by any of the assessed characteristics and metadata associated with the interactions and accounted for by the machine learning model(s) 406. Additionally, the system may hold or block certain accounts managed by the entity systems 120 or third party systems 140 that are associated with abnormal data injection. The system may also conceal one or more protective actions by randomizing the treatment or protective actions employed by the system such that users who may wish to inject abnormal data into the system will find it difficult to determine how or if the system is affected by the injected data.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function. As such, once the software and/or hardware of the claimed invention is implemented the computer device and application-specific circuits associated therewith are deemed specialized computer devices capable of improving technology associated with collaborative machine learning and population reconfiguration.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a special purpose computer for state-based learning and neural network reconfiguration, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for mitigating poisoning attacks within machine learning systems, the system comprising:
    at least one memory device with computer-readable program code stored thereon;
    at least one communication device;
    at least one processing device operatively coupled to the at least one memory device and the at least one communication device, wherein executing the computer-readable code is configured to cause the at least one processing device to:
        deploy a population of machine learning models configured to adaptively monitor interaction data, wherein the interaction data comprises interactions between one or more users and one or more entities;
        receive interaction data for interactions between the one or more users and the one or more entities and store the interaction data in a historical database;
        analyze, using the population of machine learning models, the interaction data to generate confidence scores for each of the interactions, wherein the confidence scores represent a likelihood that each of the interactions may be abnormally injected data;
        determine, based on the confidence scores, that the likelihood of abnormality for one or more of the interactions is at or above a predefined threshold; and
        remove the one or more interactions from a training data set, wherein the training data set is used to train the population of machine learning models.

2. The system of claim 1, wherein analyzing the interaction data to generate the confidence scores further comprises analyzing an array of metadata associated with the interaction data.

3. The system of claim 1, wherein the likelihood for abnormality is determined by performing a cluster analysis of the analyzed interaction data.

4. The system of claim 1, further configured to respond to the abnormally injected data by altering underlying interaction data for the abnormally injected data or altering the machine learning model population.

5. The system of claim 1, further configured to:
determine that one or more machine learning models from the machine learning model population has been trained using abnormally injected data; and
remove the one or more machine learning models from the machine learning model population.

6. The system of claim 1, wherein the population of machine learning models is retrained after removing the one or more interactions are removed from the training data set.

7. The system of claim 1, further configured to:
generate multiple unique machine learning model ensembles by adding or removing one or more machine learning models from the population of machine learning models; and
continuously analyze and compare the confidence scores of each of the multiple unique machine learning model ensembles to determine outlier characteristics.

8. A computer program product for preventing poisoning attacks in machine learning systems in real time, the computer program product comprising at least one non-transitory computer-readable medium having computer-readable program code portions embodied therein, the computer-readable program code portions comprising:
an executable portion configured for deploying a population of machine learning models configured to adaptively monitor interaction data, wherein the interaction data comprises interactions between one or more users and one or more entities;
an executable portion configured for receiving interaction data for interactions between the one or more users and the one or more entities and store the interaction data in a historical database;
an executable portion configured for analyzing, using the population of machine learning models, the interaction data to generate confidence scores for each of the interactions, wherein the confidence scores represent a likelihood that each of the interactions may be abnormally injected data;
an executable portion configured for determining, based on the confidence scores, that the likelihood of abnormality for one or more of the interactions is at or above a predefined threshold; and
an executable portion configured for removing the one or more interactions from a training data set, wherein the training data set is used to train the population of machine learning models.

9. The computer program product of claim 8, wherein analyzing the interaction data to generate the confidence scores further comprises analyzing an array of metadata associated with the interaction data.

10. The computer program product of claim 8, wherein the likelihood for abnormality is determined by performing a cluster analysis of the analyzed interaction data.

11. The computer program product of claim 8, further configured to respond to the abnormally injected data by altering underlying interaction data for the abnormally injected data or altering the machine learning model population.

12. The computer program product of claim 8, further configured to:
determine that one or more machine learning models from the machine learning model population has been trained using abnormally injected data; and
remove the one or more machine learning models from the machine learning model population.

13. The computer program product of claim 8, wherein the population of machine learning models is retrained after removing the one or more interactions are removed from the training data set.

14. The computer program product of claim 8, further configured to:
generate multiple unique machine learning model ensembles by adding or removing one or more machine learning models from the population of machine learning models; and
continuously analyze and compare the confidence scores of each of the multiple unique machine learning model ensembles to determine outlier characteristics.

15. A computer-implemented method for preventing poisoning attacks in machine learning systems in real time, the computer-implemented method comprising:
deploying a population of machine learning models configured to adaptively monitor interaction data, wherein the interaction data comprises interactions between one or more users and one or more entities;
receiving interaction data for interactions between the one or more users and the one or more entities and store the interaction data in a historical database;
analyzing, using the population of machine learning models, the interaction data to generate confidence scores for each of the interactions, wherein the confidence scores represent a likelihood that each of the interactions may be abnormally injected data;
determining, based on the confidence scores, that the likelihood of abnormality for one or more of the interactions is at or above a predefined threshold; and
removing the one or more interactions from a training data set, wherein the training data set is used to train the population of machine learning models.

16. The computer-implemented method of claim 15, wherein analyzing the interaction data to generate the confidence scores further comprises analyzing an array of metadata associated with the interaction data.

17. The computer-implemented method of claim 15, wherein the likelihood for abnormality is determined by performing a cluster analysis of the analyzed interaction data.

18. The computer-implemented method of claim 15, further configured to:
determine that one or more machine learning models from the machine learning model population has been trained using abnormally injected data; and
respond to the abnormally injected data by altering underlying interaction data for the abnormally injected data or altering the machine learning model population.

19. The computer-implemented method of claim 15, wherein the population of machine learning models is retrained after removing the one or more interactions are removed from the training data set.

20. The computer-implemented method of claim 15, further configured to:
- generate multiple unique machine learning model ensembles by adding or removing one or more machine learning models from the population of machine learning models; and
- continuously analyze and compare the confidence scores of each of the multiple unique machine learning model ensembles to determine outlier characteristics.

* * * * *